United States Patent
Bostick et al.

(10) Patent No.: US 9,444,897 B1
(45) Date of Patent: Sep. 13, 2016

(54) QUALITY OF EXPERIENCE COLLABORATION BETWEEN MOBILE DEVICES

(71) Applicant: International Business Machines Corporation, Armonk, NY (US)

(72) Inventors: James E. Bostick, Cedar Park, TX (US); Hernan A. Cunico, Holly Springs, NC (US); John M. Ganci, Jr., Cary, NC (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/939,065

(22) Filed: Nov. 12, 2015

(51) Int. Cl.
| | |
|---|---|
| H04L 29/08 | (2006.01) |
| H04W 4/02 | (2009.01) |
| H04W 24/08 | (2009.01) |
| H04L 12/58 | (2006.01) |
| H04N 21/231 | (2011.01) |

(52) U.S. Cl.
CPC ............... *H04L 67/18* (2013.01); *H04L 51/32* (2013.01); *H04W 4/028* (2013.01); *H04W 24/08* (2013.01); *H04L 67/2847* (2013.01); *H04N 21/23106* (2013.01)

(58) Field of Classification Search
CPC ... H04L 67/18; H04L 51/32; H04L 67/2847; H04W 4/028; H04W 24/08; H04N 21/23106
See application file for complete search history.

(56) References Cited

U.S. PATENT DOCUMENTS

| | | | |
|---|---|---|---|
| 9,058,324 B2 | 6/2015 | Kohlenberg et al. | |
| 9,077,631 B2 | 7/2015 | Neisinger et al. | |
| 9,137,550 B1* | 9/2015 | Velummylum | ........ H04W 4/025 |
| 2014/0188990 A1* | 7/2014 | Fulks | ...................... H04L 65/403 709/204 |
| 2014/0280735 A1 | 9/2014 | Kalaboukis et al. | |
| 2015/0103685 A1 | 4/2015 | Butchko et al. | |
| 2015/0106312 A1* | 4/2015 | Chen | ..................... H04W 4/028 706/21 |
| 2015/0211410 A1 | 7/2015 | Saville et al. | |
| 2015/0256993 A1* | 9/2015 | Bellamkonda | .......... H04W 8/12 455/433 |
| 2015/0281303 A1* | 10/2015 | Yousef | .................. H04L 65/602 709/219 |
| 2015/0326447 A1* | 11/2015 | Yoon | ................... H04L 41/5025 709/224 |
| 2015/0373565 A1* | 12/2015 | Safavi | .............. H04W 72/0453 370/252 |

FOREIGN PATENT DOCUMENTS

WO 2014052841 A1 4/2014

OTHER PUBLICATIONS

Rugel; Improving customer centricity by end-to-end Monitoring and big data analytics, 2014.

(Continued)

*Primary Examiner* — Barry Taylor
(74) *Attorney, Agent, or Firm* — Garg Law Firm, PLLC; Rakesh Garg; Mark C. Vallone

(57) ABSTRACT

At a mobile device, a location is predicted where the device will operate at a future time. A first data is obtained, the first data having been produced by a second device while being present at the location at a first time. Using a processor at the mobile device, the first data is analyzed to conclude that a type of network used by the mobile device is unusable at the location. A type of content that should be accessible from the mobile device at the location at the future time is identified. A content of the type of content is saved locally on the mobile device, wherein the saved content is accessible from the mobile device at the future time.

18 Claims, 5 Drawing Sheets

(56) References Cited

OTHER PUBLICATIONS

Anonymous; Method and System for Generating a Distributed Video Buffering Plan, Sep. 18, 2014.

Anonymous; A Policy-controlled Adaptive Platform for Querying Realtime SmartPhone Data, Jun. 26, 2013.

Anonymous; An intelligent recommendation system based on emotion analysis and behavior pattern recognition, Jul. 14, 2015.

* cited by examiner

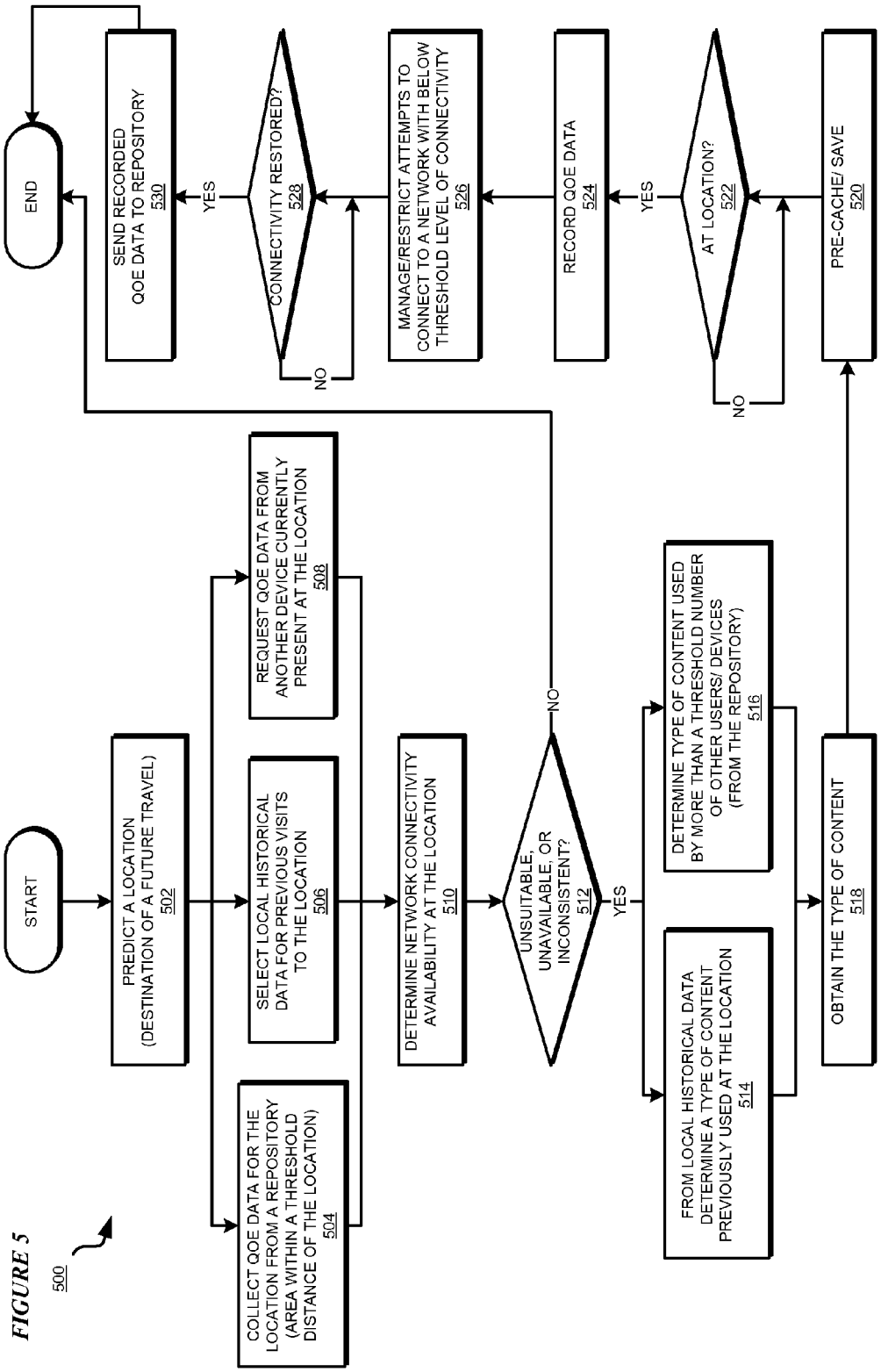

QUALITY OF EXPERIENCE COLLABORATION BETWEEN MOBILE DEVICES

TECHNICAL FIELD

The present invention relates generally to a method, system, and computer program product for collaboration between mobile devices to improve user experience at a location. More particularly, the present invention relates to a method, system, and computer program product for quality of experience collaboration between mobile devices.

BACKGROUND

Wireless communications (mobile communications) enable users to perform a variety of tasks using their mobile devices. An ever increasing number of applications is available for the wireless data processing systems, wireless data communication devices, or wireless computing platforms (collectively and interchangeably, "mobile device" or "mobile devices"). For example, many mobile devices not only allow the users to make voice calls, but also exchange emails and messages, access remote data processing systems, and perform web-based interactions and transactions.

Wearable devices are a category of mobile devices. A wearable device is essentially a mobile device, but has a form-factor that is suitable for wearing the device on a user's person. Some examples of presently available wearable devices include, but are not limited to, smart watches, interactive eyewear, devices embedded in shoes, controllers wearable as rings, and pedometers.

Quality of Experience (QoE) is a measurement of a user's experience in interacting with a mobile device at a given location. Particularly, but without being limited thereto, the QoE describes an availability of or ease of accessing data network connectivity from the location to be able to interact with a desired content on the device.

The QoE can be measured relative to one or more thresholds. For example, the QoE is above a threshold level when the device has network connectivity and can download content needed for the user's interactions. The QoE is below the threshold when the device has no network connectivity and the user is unable to have access to the desired content for the interaction.

As another example, the QoE is above a first threshold level when the device has high-speed network connectivity and below the first threshold but above a second threshold when the device has low-speed network connectivity. The QoE is below the second threshold when the device has no network connectivity.

SUMMARY

The illustrative embodiments provide a method, system, and computer program product. An embodiment includes a method that predicts, at a mobile device, a location where the device will operate at a future time. The embodiment obtains a first data, the first data having been produced by a second device while being present at the location at a first time. The embodiment analyzes, using a processor at the mobile device, the first data to conclude that a type of network used by the mobile device is unusable at the location. The embodiment identifies a type of content that should be accessible from the mobile device at the location at the future time. The embodiment saves a content of the type of content locally on the mobile device, wherein the saved content is accessible from the mobile device at the future time.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a flowchart of an example process for quality of experience collaboration between mobile devices in accordance with an illustrative embodiment.

DETAILED DESCRIPTION

Figure 1:
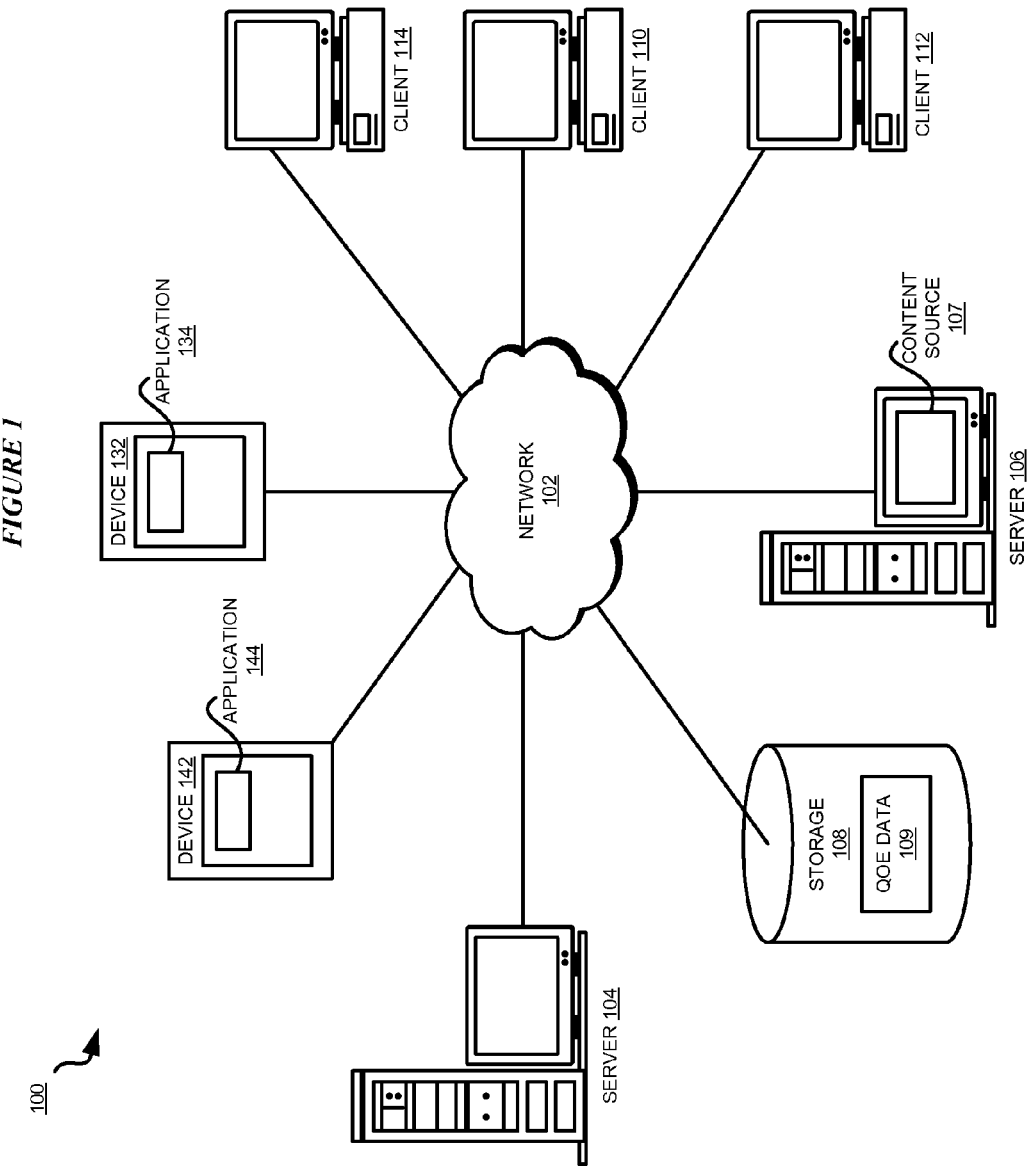
FIG. 1 depicts a block diagram of a network of data processing systems in which illustrative embodiments may be implemented.

Different network service providers—also known as carriers—have different degrees of coverages in different areas. Where one carrier might have connectivity available at a location, another carrier might provide no coverage at all. Generally, a location might not have any coverage at all, or different degrees of coverages from different carriers.

Furthermore, even when different carriers provide coverage at a location, different carriers might provide different types of coverages. For example, one carrier might provide Fourth Generation (4G) Long Term Evolution (LTE) coverage while another might only provide Enhanced Data GSM Environment (EDGE) coverage. Different devices have differing compatibilities with different types of networks. An older device might only be capable of connecting with Third Generation (3G) or slower networks, whereas a newer device might be able to connect with any of the 4G LTE or slower networks. Some devices can communicate only over Code division multiple access (CDMA) networks, whereas other devices may be able to communicate over GSM network or both Global System for Mobile communication (GSM) and CDMA networks.

Different devices also behave differently at different locations. For example, depending upon their designs, different devices might experience different signal strengths on the same carrier's network at the same location. Even identical devices, encased in different types of protective cases can experience different signal strengths and connectivity on the same carrier's network from the same location. For example, a device without a protective case might connect to a carrier's network at 4G speed and another device in a protective case might only connect to the same network at EDGE speed.

The illustrative embodiments recognize that different locations have different degrees of coverages, types of networks available, and other connectivity factors. A QoE from the location is dependent not only upon the actual network available there but also on the type of device that is trying to gain connectivity from that location.

The illustrative embodiments further recognize that a device connected to a weak or overloaded network expends significantly higher amount of power in trying to establish or maintain the connection as compared to a device that has comparatively better connectivity. The excessive draw on the battery reduces the amount of time the user can interact with the device, thereby also adversely affecting the QoE at the location.

The illustrative embodiments used to describe the invention generally address and solve the above-described problems and other problems related to QoE while using a device at a location.

An embodiment can be implemented as a software application in a mobile device. Several mobile devices of any kind can include an embodiment in this manner, and collaborate as described herein.

An embodiment executing in a mobile device determines that a user of the device is likely to travel to a location at a future time. In other words, the embodiment determines that a greater than a threshold level of likelihood exists that the device is going to be operating at the location at the future time.

As some non-limiting examples, the embodiment makes this determination by detecting patterns of past travels of the user, comments in social media interactions of the user, buying or website visiting activities that point to an upcoming travel and its destination, and the like. For example, the user may travel to a location of a hiking location during the first week of July every year. As another example, the user may have just bought some hiking gear and performed airfare searches for a hiking destination.

Many mobile devices associated with many users collaborate in improving the QoE according to the illustrative embodiments. For example, some other devices may have operated at the location where the device is likely to be operating at the future time. Such other devices contribute information to a crowd-sourced repository, and the information is usable in improving the QoE at the location. For example, a device that operated at the location previously may contribute QoE information, which includes but is not limited to—a type of the device, a type of the subscribed network, a type of network searched for at the location, a type of network attempted for connection at the location, signal strength measurements of such one or more networks at the location, a purpose—such as a type of content—for which network access was attempted, and the like.

The repository collects QoE data contributed by a variety of devices, from a variety of locations, about a variety of networks, at different times, for a variety of purposes, or some combination thereof. The embodiment extracts from the repository the QoE data that is related to the type of the device, the location, the type of the network on which the device operates, or a combination of these and other factors.

In some cases, the device itself may have operated from the location in the past, such as during a past trip of the user to the location. Thus, the device may locally contain historical QoE data that is specific to the device's configuration. When available, the embodiment extract from the local historical data the QoE data related to the device, the network, and the location.

In some cases, other devices might be presently operating at the location where the device is expected to operate in the future. The embodiment locates, such as with the assistance of a service-provider system, a set of other devices presently operating at the location. The embodiment requests the QoE data from the set of devices. The QoE data from the set of devices relates to the type of the requesting device, the network on which the requesting device operates, the location, or some combination thereof.

The embodiment collects QoE data from a local repository, a crow-sourced repository, or via a device-to-device interaction with other devices at the location. The embodiment analyzes the collected QoE data to determine a degree and type of network connectivity available at the location. If according to the QoE data analysis, the network connectivity is unavailable, unusable by the device, or is unreliable, the embodiment determines a type of content the user is likely to need at the location.

If the user has traveled to the location previously, the type of content that the user is likely to need at the location may also be a part of the historical data in the local repository of the device. In addition, or when such historical data is locally unavailable, the embodiment extracts the type of content used by greater than a threshold number of users according to the crowd-sourced QoE data from the repository, the set of other devices, or both.

For example, the user may have used map data during a previous visit to the location. Alternatively, greater than a threshold number of other users may have used map data while visiting the location.

Responsive to determining that the network connectivity will be unusable, unavailable, or unreliable, and further responsive to identifying a type of content likely to be needed by the user at the location, the embodiment obtains the content from a content source. For example, the embodiment downloads the map data for the location and the surrounding area from a map data source.

The embodiment caches or saves the obtained content. Such a manner of obtaining and saving the content ahead of time is referred to herein as pre-caching.

When the device actually travels to the location, an embodiment collects QoE data about the network conditions during the device's operation at the location. As described herein, the collected QoE data also includes the type of the device, the type of the network attempted for access—e.g., the provider or protocol or both, and additional information—such as a purpose. For example, the QoE data may include a list of websites or types of content attempted for access from the location.

When network connectivity is re-gained at the device, the embodiment uploads the collected QoE data to the crowd-sourced repository. Another embodiment in another device uses the contributed QoE data in a manner described herein for a later trip to the location.

If the network connectivity at the location is unusable, unavailable, or unreliable, as may be determined from the QoE data analysis, an embodiment configures a communication module of the device to conserve power. For example, the embodiment switches the communication module to a mode where the module does not repeatedly hunt for network signal and repeatedly and unsuccessfully attempts to connect to any available network. The configuration allows the module to conserve power and other resources of the device while the device operates at the location.

A method of an embodiment described herein, when implemented to execute on a device or data processing system, comprises substantial advancement of the functionality of that device or data processing system in quality of experience collaboration between mobile devices. For example, presently available pre-caching methods require the user to select the pre-caching operation and identify the content that is to be pre-cached. An embodiment predicts a future location of travel, a QoE that can be expected at that location based on the device's own and other devices' operations at the location, a type of content likely to be needed on the device at the location, and pre-caching such content. This manner of quality of experience collaboration between mobile devices is unavailable in the presently available methods. Thus, a substantial advancement of such devices or data processing systems by executing a method of an embodiment is in improving a QoE during a user's interaction with the device at the location.

The illustrative embodiments are described with respect to certain locations, predictions, thresholds, QoE factors, repositories, analyses, content, type of content, networks, types of networks, types of devices, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
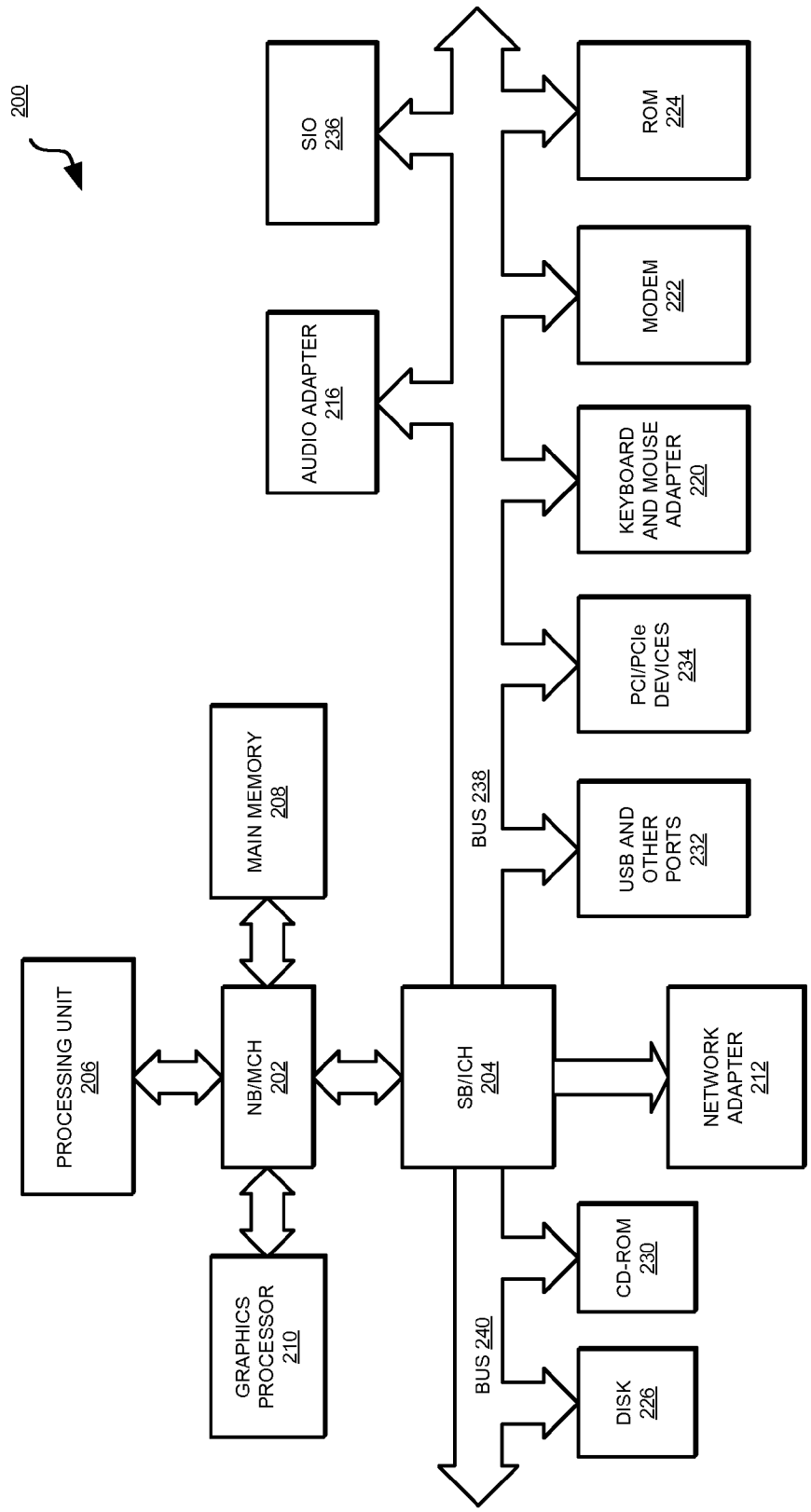
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Device 132 can be regarded as the device that will operate at a location at a future time. Application 134 implements an embodiment described herein. Device 142 is another mobile device. Application 144 implements an embodiment described herein in device 142. Device 132 and any number of devices 142 collaborate to improve the QoE as described herein. Some devices 142 may be present at the location at a current time, some devices 142 may have been present at the location at a previous time. Application 134 or 144 in a device, such as in device 132 or 142, respectively, contributes QoE data 109 to crowd-sourced repository 108. Content source 107 provides content to device 132 for pre-caching. Application 134 uses QoE data 109 as described herein. Applications 134 and 144 cause devices 132 and 142 to perform a device-to-device communication to exchange QoE data as described herein. Applications 134 and 144 also cause their respective devices 132 and 142 to store historical QoE data from their previous operations at various locations.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 or 142 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 134 and 144 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
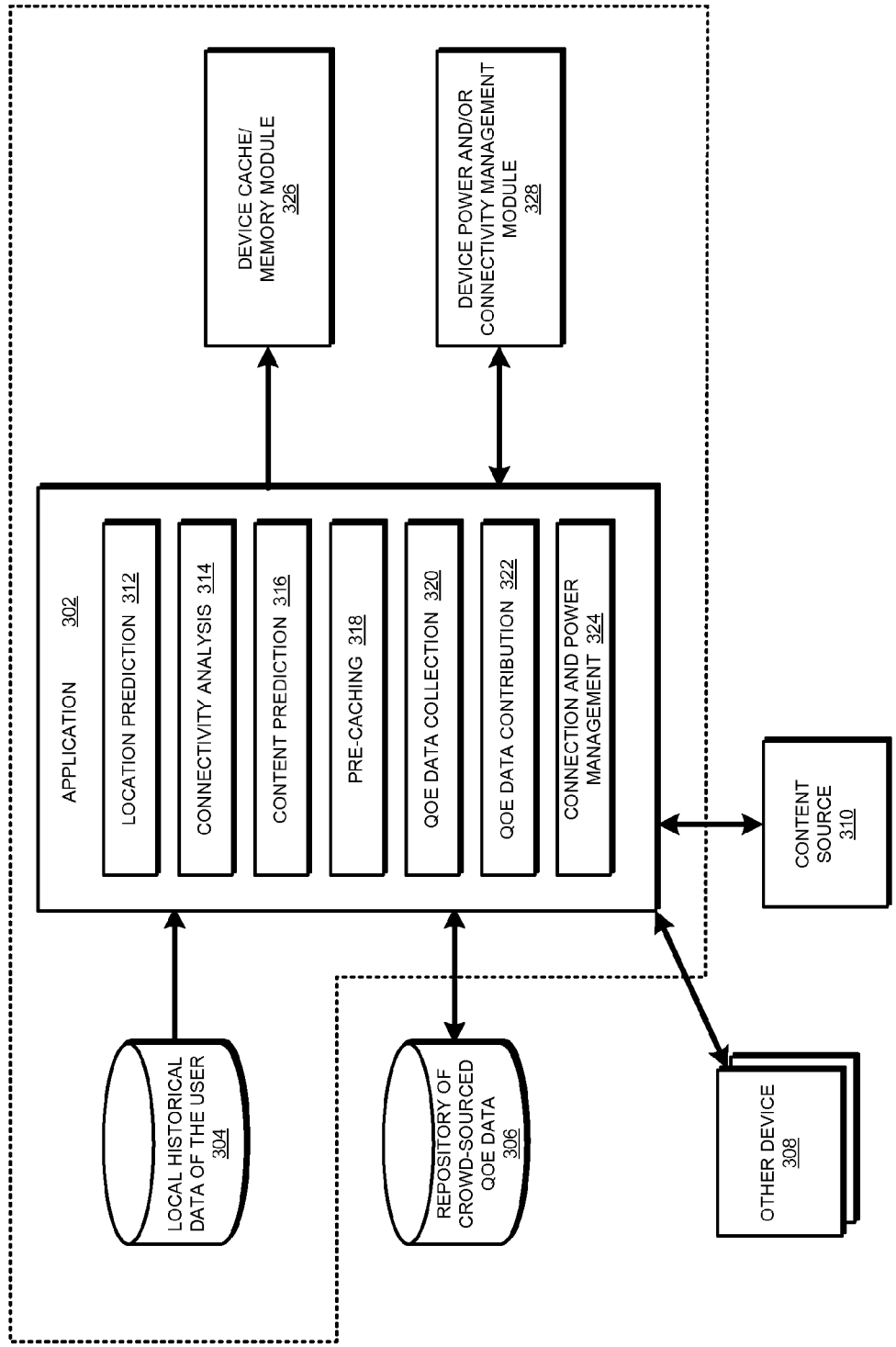
FIG. 3 depicts a block diagram of an example configuration for quality of experience collaboration between mobile devices in accordance with an illustrative embodiment.

With reference to FIG. 3, this figure depicts a block diagram of an example configuration for quality of experience collaboration between mobile devices in accordance with an illustrative embodiment. Device 300 is an example of device 132 in FIG. 1. Application 302 is an example of application 134 in FIG. 1. Device 300 is likely to operate from a determined location at a future time.

Local historical data of the user 304 is available in a local data storage of device 300 or in a storage configured to hold the data of device 300, such as a computer of the user of device 300, with which device 300 synchronizes. Repository 306 is a repository of crowd-sourced QoE data, such as repository 108 of QoE data 109 in FIG. 1.

Other devices 308 are one or more examples of device 142 of FIG. 1. Content source 310 is an example of content source 107 in FIG. 1.

Component 312 predicts a likelihood of operation at a location at a future time. When the likelihood exceeds a threshold degree of likeliness, component 312 selects the location as the determined location and the time of operation at the determined location as the future time.

Using QoE data from local historical data 304, repository 306, other devices 308, or some combination thereof, component 314 performs an analysis of network connectivity available at the determined location.

Component 314 may determine that the connectivity at the location has a greater than a threshold likelihood of being unusable—such as of an unsuitable type or protocol, unavailable—such as when the signal strength is below a threshold level of signal strength, or unreliable—such as when devices report varying signal strengths at different times. Under such circumstances, component 316 predicts the content or a type of the content that might be needed on device 300 at the location. For example, responsive to local historical data 304 including information about the content that the user used during a previous visit to the location, component 316 selects the same or similar content from content source 310 for the future visit.

As another example, responsive to at least a threshold number of users using a particular content or type of content—such as map data—according to the QoE data from repository 306, component 316 selects the same or similar content from content source 310 for the future visit. Similarly, if application 302 collects QoE data from other device 308 currently at the location, component 316 determines the content or the type of content that at least a threshold number of users of devices 308 are currently using and selects the same or similar content from content source 310 for device 300's future visit.

Once the specific content or the content of a specific type is obtained from content source 310, such content has to be saved in device 300 for use at the future time. Component 318 saves—or pre-caches—the content obtained from content source 310 into cache or memory module 326 of device 300.

At the determined future time device 300 becomes located at the determined location. While operating at the determined location at the future time, component 320 collects one or more instances of QoE data. When device 300 regains connectivity to a data network, component 322 contributes or uploads the collected QoE data to repository 306.

While device 300 is operating at the determined location at the future time, a desired network is unusable, unavailable, or unreliable as described herein. Accordingly, component 324 configures module 328 to reduce a frequency of attempting to connect to a network or maintain connectivity to a network, and thereby reducing a power consumption at device 300.

Figure 4:
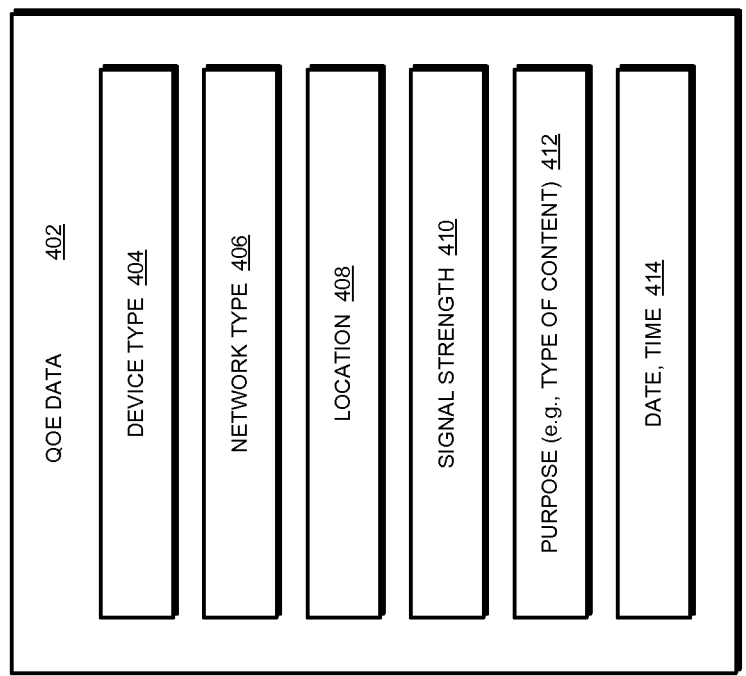
FIG. 4 depicts a block diagram of an example configuration of QoE data in accordance with an illustrative embodiment.

With reference to FIG. 4, this figure depicts a block diagram of an example configuration of QoE data in accordance with an illustrative embodiment. QoE data 402 can be stored as local historical data 304, in repository 306, or in other devices 308 in FIG. 3.

For the QoE data to be usable by application 302 in a manner described herein, the QoE data should provide at least the shown pieces of information. For example, QoE data 402 includes type 404 of the device that captured QoE data 402. Type 404 can be a make, model, configuration, or some combination thereof, of the capturing device.

Network type 406 is the type of network on which the capturing device operates, the type of network the device sought for connection, a protocol on which the network operates, a name of the network, a name of a service provider of the network, or some combination of these and other descriptive information about a wireless data network.

Location 408 is the location at which QoE data 402 was captured. Location 408 can be a specific point on the ground or in three-dimensional space—including elevation, or an area within a specified distance from a point on the ground. Signal strength 410 is a measurement of a strength of the signal of the network of type 406.

Purpose 412 is a purpose to descriptive information about a reason for which the connectivity with the network of type 406 was tried. In one embodiment, the purpose can be a type of content or even a specific content that was attempted for obtaining from a content source. Date and time 414 indicate the time at which QoE data 402 was captured to represent the network condition from location 408 at the time.

As can be seen, a device may capture numerous instances of QoE data 402, such as at different dates or times 414, at different points within location 408, or both. Some device types 404 may capture different instances of QoE data 402 for different network types 406 attempted for connectivity. Even for the same device type 404, network type 406, and location 408, signal strength 410 may be different at different dates or times 414, indicating unreliability of the network.

With reference to FIG. 5, this figure depicts a flowchart of an example process for quality of experience collaboration between mobile devices in accordance with an illustrative embodiment. Process 500 can be implemented in application 302 in FIG. 3.

The application predicts a location, which is likely to be a destination for a future travel (block 502). The application may perform any one, any two, or all three of blocks 504, 506, and 508 thereafter. The application may collect QoE data for the location from a crowd-sourced repository (block 504), select local historical QoE data from a previous visit to the location (block 506), request QoE data from another device that may be present at the location currently (block 508), or some combination thereof.

The application analyzes the information collected at some combination of blocks 504, 506, and 508, to determine an availability of network connectivity at the location (block 510). The determination of block 510 is for a set of one or more desired or preferred networks.

The application determines whether all of the one or more preferred networks are unsuitable, unavailable, or unreliable at the location (block 512). If at least one of the one or more preferred networks is usable, available, and reliable ("No" path of block 512), the application ends process 500 thereafter.

If the set of preferred networks is unusable, unavailable, or unreliable ("Yes" path of block 512), the application performs one or both of blocks 514 and 516. For example, when QoE information for the location is locally available, the application determines from the local historical data a type of content previously used by the user at the location (block 514), a type of content used by more than a threshold number of other users or devices at the location according to the QoE data from a crowd-sourced repository (block 516), or both.

The application obtains the determined type of content (block 518). The application pre-caches the obtained content (block 520).

The application determines whether the device is positioned at the location at a future time (block 522). If the device is not at the location, such as within an area defined by a distance from a point on the ground ("No" path of block 522), the application returns to block 522 to make the determination again after some time.

If the device is at the location ("Yes" path of block 522), the application records one or more instances of QoE data while the device operates at the location (block 524). While the device is operating at the location, the application configures the device to manage or restrict the attempts to connect to a preferred network from the set of preferred networks while the preferred network exhibits a lower than a desirable level of signal strength or connectivity (block 526).

The application determines whether the connectivity to a preferred network has been restored at the device, such as when the device has moved away from the location (block 528). If the connectivity has not been restored ("No" path of block 528), the application returns to block 528 to make the determination again after some time.

If the connectivity to at least one preferred network from the set has been restored at the device ("Yes" path of block 528), the application sends the recorded instances of QoE data from block 524 (block 530). The application ends process 500 thereafter.

Thus, a computer implemented method, system or apparatus, and computer program product are provided in the illustrative embodiments for quality of experience collaboration between mobile devices. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining that a user of the mobile device has (i) made a comment on social media and (ii) logged on to a website, wherein the comment and the logging on have a location as a common aspect;
   predicting, at a mobile device, the location where the device will operate at a future time;
   obtaining a first data, the first data having been produced by a second device while being present at the location at a first time;
   analyzing, using a processor at the mobile device, the first data to conclude that a type of network used by the mobile device is unusable at the location, wherein the type of the network is unusable because of providing different signal strengths at different times;
   identifying a type of content that should be accessible from the mobile device at the location at the future time; and
   saving a content of the type of content locally on the mobile device, wherein the saved content is accessible from the mobile device at the future time.

2. The method of claim 1, further comprising:
   detecting that the mobile device is operating at the location;
   recording a quality of experience (QoE) data at the mobile device, wherein the QoE data comprises (i) a type of the mobile device, (ii) the type of the network used by the mobile device, and (iii) a strength of a signal from the network used by the mobile device.

3. The method of claim 2, wherein the QoE data further comprises (iv) a second strength of a second signal from a second network, wherein the second network is also usable by the mobile device.

4. The method of claim 2, wherein the QoE data further comprises (iv) a second strength of a second signal from a second network, wherein the mobile device is not configured to use the second network.

5. The method of claim 2, wherein the QoE data further comprises (iv) a purpose of accessing the network at the location.

6. The method of claim 5, wherein the purpose comprises a type of content, wherein the type of content is for use at the location.

7. The method of claim 2, further comprising:
detecting that the mobile device has moved from the location to a second location;
connecting to the network from the second location; and
uploading the QoE data from the mobile device to a crowd-sourced repository.

8. The method of claim 2, further comprising:
configuring a communication module of the mobile device to reduce a frequency of attempting connection with the network from the location.

9. The method of claim 1, further comprising:
determining, from the first data, as a part of the identifying, a type of content used at the second device at the location at the first time; and
using the type of content from the first data as the type of content that should be available from the mobile device.

10. The method of claim 1, wherein the type of the network is unusable by providing a connection speed below a threshold connection speed.

11. The method of claim 1, wherein the type of the network is unusable by providing a signal of a strength below a threshold signal strength.

12. The method of claim 1, further comprising:
accessing a crowd-sourced repository, wherein the crowd-sourced repository receives the first data from the second device and a second data from a third device, the second data being produced by the third device while being present at the location at a second time;
determining that a type of the second device recorded in the first data matches a type of the mobile device;
determining that a type of the third device recorded in the second data fails to match the type of the mobile device; and
selecting, for the obtaining from the crowd-sourced repository, the first data while omitting the second data.

13. The method of claim 1, further comprising:
accessing a crowd-sourced repository, wherein the crowd-sourced repository receives the first data from the second device and a second data from a third device, the second data being produced by the third device while being present at the location at a second time;
determining that a type of network recorded in the first data matches the type of network used by the mobile device; determining that a type of network recorded in the second data fails to match the type of network used by the mobile device; and
selecting, for the obtaining from the crowd-sourced repository, the first data while omitting the second data.

14. The method of claim 1, further comprising:
detecting that the second device is presently located at the location; and
sending, responsive to the detecting, a request to the second device for the first data, wherein the obtaining is responsive to the request.

15. The method of claim 1, further comprising:
identifying, at the mobile device, a local information, the local information resulting from a previous operation of the mobile device at the location at a past time.

16. The method of claim 1, wherein the method is embodied in a computer program product comprising one or more computer-readable storage devices and computer-readable program instructions which are stored on the one or more computer-readable storage devices and executed by one or more processors.

17. A computer program product comprising one or more computer-readable storage devices, and program instructions stored on at least one of the one or more storage devices, the stored program instructions comprising:
program instructions to determine that a user of the mobile device has (i) made a comment on social media and (ii) logged on to a website, wherein the comment and the logging on have a location as a common aspect;
program instructions to predict, at a mobile device, the location where the device will operate at a future time;
program instructions to obtain a first data, the first data having been produced by a second device while being present at the location at a first time;
program instructions to analyze, using a processor at the mobile device, the first data to conclude that a type of network used by the mobile device is unusable at the location, wherein the type of the network is unusable because of providing different signal strengths at different times;
program instructions to identify a type of content that should be accessible from the mobile device at the location at the future time; and
program instructions to save a content of the type of content locally on the mobile device, wherein the saved content is accessible from the mobile device at the future time.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to determine that a user of the mobile device has (i) made a comment on social media and (ii) logged on to a website, wherein the comment and the logging on have a location as a common aspect;
program instructions to predict, at a mobile device, the location where the device will operate at a future time;
program instructions to obtain a first data, the first data having been produced by a second device while being present at the location at a first time;
program instructions to analyze, using a processor at the mobile device, the first data to conclude that a type of network used by the mobile device is unusable at the location, wherein the type of the network is unusable because of providing different signal strengths at different times;
program instructions to identify a type of content that should be accessible from the mobile device at the location at the future time; and
program instructions to save a content of the type of content locally on the mobile device, wherein the saved content is accessible from the mobile device at the future time.

* * * * *